(12) United States Patent
Van Balveren et al.

(10) Patent No.: US 7,896,652 B1
(45) Date of Patent: Mar. 1, 2011

(54) CHILD DAY PLANNER AND SUB-TASK SEQUENCE PLANNER

(76) Inventors: Kim Gallo Van Balveren, Palm Beach Gardens, FL (US); Zoe Moultrie Selkirk, Palm Beach Gardens, FL (US)

( * ) Notice: Subject to any disclaimer, the term of this patent is extended or adjusted under 35 U.S.C. 154(b) by 378 days.

(21) Appl. No.: 12/168,805

(22) Filed: Jul. 7, 2008

Related U.S. Application Data

(60) Provisional application No. 60/959,853, filed on Jul. 17, 2007.

(51) Int. Cl.
*G09B 19/00* (2006.01)

(52) U.S. Cl. ...................................... 434/236

(58) Field of Classification Search ................. 434/175, 434/178, 199, 236, 237, 238, 365, 405, 433
See application file for complete search history.

(56) References Cited

U.S. PATENT DOCUMENTS

| | | | | |
|---|---|---|---|---|
| 2,414,614 A | * | 1/1947 | Shurick, Sr. ................. | 434/238 |
| 2,564,846 A | * | 8/1951 | Hughes ........................ | 40/110 |
| 2,883,765 A | * | 4/1959 | Blaine ......................... | 434/238 |
| 3,782,009 A | * | 1/1974 | Darnell ....................... | 434/238 |
| 4,384,855 A | | 5/1983 | Walsh | |
| 4,776,799 A | * | 10/1988 | Walsh ......................... | 434/238 |
| 5,257,940 A | * | 11/1993 | Schaarschmidt ............ | 434/304 |
| 5,372,509 A | * | 12/1994 | Brocato et al. .............. | 434/238 |
| 5,431,450 A | * | 7/1995 | Coleman ..................... | 283/62 |
| 5,573,404 A | * | 11/1996 | Stawski, II .................. | 434/238 |
| 5,573,405 A | * | 11/1996 | Evans .......................... | 434/238 |
| 5,577,915 A | | 11/1996 | Feldman | |
| 5,639,242 A | | 6/1997 | Wilson | |
| 5,725,381 A | | 3/1998 | Kollath et al. | |
| 5,851,117 A | * | 12/1998 | Alsheimer et al. .......... | 434/219 |
| 6,203,327 B1 | | 3/2001 | Ottrando | |
| 6,345,821 B1 | | 2/2002 | Labrot | |
| D458,303 S | | 6/2002 | Daugherty | |
| 6,572,380 B1 | * | 6/2003 | Buckley et al. ............. | 434/238 |
| 6,837,714 B2 | | 1/2005 | Womack | |

* cited by examiner

*Primary Examiner*—Kurt Fernstrom

(57) ABSTRACT

One embodiment of a device that provides a means of displaying pictures that represent activities, or steps within an activity, for the purpose of teaching a sequence, displaying expectations, and encouraging participation in new or existing routines. The device is comprised of a board (FIG. 1) that is capable of displaying visual cues in the form of picture cards (FIG. 4A/B/C) in a plurality of interior channels. The pictures can be viewed from the front of the board (FIG. 1) and are moved from a 'To Do' column (9) to an 'All Done' column (7) as tasks or steps within a sequence are completed. The board (FIG. 1) is constructed in such a fashion as to create interior channels that allow the unimpeded passage of picture cards (FIG. 4A/B/C) through the entire interior of the board (FIG. 1). The picture cards (FIG. 4A/B/C) that pass through the channels are of a size that is slightly smaller than the interior dimensions to allow them to be inserted, slid across, and removed from the board (FIG. 1). The frontal area of the board (FIG. 1) incorporates 'frame like' openings that allow the picture cards (FIG. 4A/B/C) to be slid across by using a finger pressed upon the surface of the card and applying slight pressure to move it across. The device is designed to be vastly versatile and capable of being used by many age groups and in many situations.

2 Claims, 4 Drawing Sheets

18

19

20

21  21a

22

23

CHILD DAY PLANNER AND SUB-TASK SEQUENCE PLANNER

CROSS REFERENCE TO RELATED APPLICATIONS

This application claims the benefit of provisional patent application Ser. No. 60/959,853, filed 2007 Jul. 17 by the present inventors.

FEDERALLY SPONSORED RESEARCH

Not Applicable

SEQUENCE LISTING OR PROGRAM

Not Applicable

BACKGROUND OF THE INVENTION

1. Field of Invention

This invention generally relates to visual schedules and visual learning, specifically child day planners, and sub-task sequence planners. The fields of parenting, education, motivational devices, and devices that act as visual reminders all contribute background to this invention. The invention may be primarily used for the education and motivation of children, however it is not restricted to such an age group.

2. Prior Art

Most children are visual learners. They excel in recognition and recollection when given the opportunity to visualize activities and sequences. For example, telling a younger child that a flower had 4 pink petals will not conjure or fix that image in their mind the way that showing them a picture of that flower would.

Providing a medium that delivers a visual and immediate explanation of a sequence or task is the fastest way for children to associate steps in a process, or changes that may happen during their day. The use of 'visual learning' in schools is understood to enhance thinking and learning skills. Older children use visual learning techniques to focus on the meaning of something, reorganize or group similar ideas, and overall make better use of their visual memory.

Verbally communicating a request or desire assumes that the person you are requiring compliance from understands the verbiage and desired outcome of that request or desire. It is a common source of conflict among parents, teachers, and caregivers who for various reasons (for safety, to achieve progress, to perform a duty etc) need to convey instructions and have their charges follow direction.

For example, within the home, parents crave compliance and harmony at many stages in their child's development. Having older children contribute to household tasks, prompting younger children to learn sequences such as the steps involved in potty training, or helping a fractious toddler become less anxious about their day are all desirable outcomes that oftentimes parents find elusive. In many cases, parents instruct their children verbally, making the assumption that this mode of communication is concise enough to be understood and followed. However, frustration results when children seem to 'forget' the parent's requests, or appear confused as to what is required of them.

For teachers, engaging students in daily classroom activities is essential when attempting to achieve order during their day. Having so many children (who may have varying degrees of language capability) understand verbal cues can be a continual challenge, again leading to frustration on the part of the teacher in the classroom environment.

For caregivers of patients young and old, conflict arises when verbal communications fail to convey correct meaning, resulting in frustration and slow progress.

Currently, visual schedules and motivational devices are primarily used to obtain a desired behavior by exchanging token rewards for the performance of said behavior. This aspect creates an emphasis on obtaining rewards, and places a burden upon a parent, teacher, or caregiver to supply a reward or special treat for behaviors that could be obtained without this element of 'bribery'.

A desirable feature of a visual schedule is that it provides visual cues that are understandable to the user, regardless of their language skills. Young children, who may not be able to read, are much more likely to comply with a request, or learn a sequence, if they can see a picture or list of pictures that define the activity or sequence.

It is also desirable that the cues are not static or restricted to one specific routine or sequence. Providing a means to display many routines, over time, and appropriate to a child's development and age increases the effectiveness of the visual schedule through consistent use and recognition.

Another desirable feature is that the schedule incorporates some form of interaction with the user that encourages participation in the routine or sequence being displayed. Children are more eager to perform a task if the medium containing the visual cues invites them to interact with it, and easily clearly conveys their progress. This mode of interaction is an essential feature. Schedules that require the user to write or draw on them, that need an adult to operate, or do not convey progress in a clearly understandable fashion, do not hold the interest of the children using them. To successfully implement a visual schedule, there must be a mechanism used by the schedule that allows users of all ages to operate and manipulate it, irrespective of language or reading skills.

Utilizing a mechanism that allows children of many ages and abilities to operate a visual schedule (or a list of pictures representing a sequence of activities) also increases the number of situations where the child can successfully use the schedule independently. Being able to perform tasks or sequences without the supervision required by other motivational devices allows children a controlled measure of independence (which they crave) that is acceptable to parents.

The schedule should also be portable, in order to be used in any location that is appropriate to the activity or sequence being depicted. Coupled with the versatility of being able to depict many routines and tasks, this aspect increases the longevity and situational relevance of the schedule.

A variety of devices have been previously developed that provide visual cues, however the majority utilize the token reward system, and are static representations of one activity, unable to be used for many tasks or sequences, in many locations. Previous devices have concentrated primarily on household chores as the only set of routines or activities that parents in particular would like their children to comply with. Little attention has been given to providing a solution that addresses the many situations where visual representations can clarify spoken instructions and smooth the process of learning a new sequence or routine, or encourage participation is these sequences or routines.

U.S. Pat. No. 6,837,714 to Womack discloses a magnetic device for the use of dispensing and tracking of household or business duties. The device is intended to be used in the absence of the person communicating instructions; however, this device is restricted to use in certain locations due to being magnetized, and does not use pictures to communicate the desired goal.

U.S. Pat. No. 6,345,821 to Labrot discloses a game for designation of chores. This device uses a 'game like' environment as a means of assigning chores to family members; however, it does not utilize pictures as a means of communicating an objective or steps contained within a process. There is also no element of versatility to this device in that it is restricted to chore designation only.

U.S. Pat. No. 6,203,327 to Ottrando discloses a toilet training system, using a board having a preprinted path with path beginning and path end. The device uses a visual means of displaying the number of times a child has used the potty with success; however it does not break down the sequence of steps required to learn the process of potty training, or provide pictorial reinforcement of the verbal instructions parents are using. There is little interaction on behalf of the child, with operation of the system resting with the parent. The device also cannot subsequently be used to teach a new task when mastery of using the potty is achieved and the device is no longer need for that specific purpose.

U.S. Pat. No. 5,725,381 to Kollath et al discloses a motivation system for children, consisting of a board, play money, and coupons for various predefined rewards. This device relies upon rewards in exchange for performance of specific behaviors, which are agreed between parent and child. Although the instructions displayed on the device can be erased and rewritten, the device does not utilize visual cues or define sequences that may help the child in performance of their duties. The device uses 'play money' as the primary motivational factor, which places a burden upon the parent to bargain and maintain a system of 'task for reward'. The device is also restricted to use in this narrow circumstance.

U.S. Pat. No. 5,577,915 to Feldman discloses a motivational task tracking device that organizes chores, activities, or other things into categories, providing an incentive system for their performance. This device does incorporate the use of pictures as a means of communicating goals, and the primary motivational factor is again, achieving a reward. The device also categorizes activities into time specific events, and incorporates personal behavior as a subjective goal. The face of the device presents activities over a prolonged period of time which may be useful for older children, however it does not provide the frequent reinforcement younger children need, nor does it provide a means of displaying the steps involved to help children complete the required tasks. Operation of the system appears to be the responsibility of the parent, and the mechanism for use does not invite the child to participate or grant them the independence to use the system on their own, or in other circumstances.

U.S. Pat. No. 5,573,405 to Evans discloses a behavior training and modification device. This device does display tasks and activities that are to be done, however the focus of the device is behavior modification through feedback. This device does not employ pictures to exemplify activities, and has no means of displaying the sub-tasks involved in performance of the required activities. The device may be used for one purpose and cannot be used independently to teach a new activity.

U.S. Pat. No. 5,573,404 to Stawski discloses a behavior modification device and process. This device can be used to elicit participation in household chore activities in exchange for payment of allowances. The device must be placed in a location that allows the user to write upon its surface, and is useful for children who are able to read. In addition to performing as a token reward system, the device displays imposition of consequences in the form of deductions from the earned allowance. This system focuses on reward and consequence as the sole means of eliciting participation. There is no use of pictures or other visual element aside from written lists used in this device, and it does not encourage interaction or teach the steps involved in any process.

U.S. Pat. No. 5,639,242 to Wilson discloses an educational device for motivating, monitoring, and rewarding children's task performance. The device utilizes a game format to assign household chores in exchange for arranged rewards. The names of chores are noted on hanging cards and the children are required to 'play' the game in order to participate. The device must be mounted or adhered to a flat surface which limits its mobility and locations it can be used in throughout the home. The device primarily functions as a means of soliciting help at home, and does not display or teach the steps involved in a diverse range of activities of sequences.

U.S. Pat. No. 4,384,855 to Walsh discloses an educational device for recording children's achievements in performing tasks. The device records performance of activities over a more prolonged period of time which is not useful to younger children who require either immediate or more frequent reinforcement of their progress. The device does suggest the use of pictures to represent the activities parents seek compliance with; however the parent must write or draw their requirements and assume their drawings are clear and identifiable. Again, this device acts as a record of performance of chores only and does not seek to teach sequences or leverage the benefits of visual schedules, or 'lists of pictures'. The device also requires a check or mark to be made against a completed task which requires the unit to be placed in a location where it can be written upon, which is not necessarily the place where a task or activity occurs.

U.S. Pat. D458,303 to Daugherty discloses the ornamental design for a magnetic calendar. This calendar uses marker erasable pieces to depict household chores that can be assigned to individuals noted on the page. Firstly, the device must be adhered to a metallic surface, and is not appropriate for use in varying locations. Secondly, the device is restricted to the performance of chores only and does not teach sequences or new routines.

SUMMARY

In accordance with one embodiment, this invention provides a means of displaying pictures that represent activities, or steps within an activity, for the purpose of teaching a sequence, displaying expectations, and encouraging participation in new or existing routines via interaction with the device.

In the case of parents with younger children with limited language capability, the invention allows the parent to display the steps involved in learning a new activity (such as but not limited to potty training), in a convenient location, for the purpose of teaching and reinforcing said activity. The invention relieves the frustration exhibited by younger children when they fail to perform as verbally requested, by providing visual prompts that keep them on track and lead them through the process they are attempting to master. In addition to this, the invention can be used as a visual depiction of a child's daily routine, helping younger children to transition from one planned activity to the next and relieving their anxiety—something that frequently manifests as tantrums or 'acting out'.

In the case of parents of older children, the invention allows the parent to not only display the steps involved in a new routine or process (such as 'put away shoes', 'make bed', 'clothes in hamper', 'toys away' for the overall requirement of 'tidy bedroom'), it also communicates parents expectations in the circumstance where children are old enough to help at home and relieve some of the parents household burden. Older children can use the invention independently to note their responsibilities, track progress, or learn something new. This relieves the parent of the frustrating task of repetitively reminding (nagging) their child and oftentimes, performing the task themselves.

Teachers and caregivers can use the invention for similar reasons; teaching new sequences, reinforcing responsibilities, displaying routines, tracking progress, encouraging independence, and relieving anxiety. Overall, the invention can provide the user with a micro-level, visual, daily planning system that can be easily used by those with limited recall, or who require a visually simulating method of following activity transitions or sequences.

DRAWINGS— FIGURES

REFERENCE NUMERALS

1—Front Board Surface
2—Left Hanging Hole
3—Right Hanging Hole
4—Day of the Week Slider Partition
5—'To Do' Column Designation
6—'All Done' Column Designation
7—'To Do' Distinct Inner Column
8—Picture Card Slider Partition
9—'All Done' Distinct Inner Column
10—Slider Partition Exit Point
11—Slider Partition Entry Point
12—Interior Layer Slider Partition Divider
13—Board Rear Layer
14—Board Top Layer
15—Rear Board Surface
16—Board Top Edge
17—Board Bottom Edge
18—Picture Card Front Surface
18a—Activity Picture
18b—Descriptive Text
19—Picture Card Rear Surface
20—Picture Card Side Edge
21—Day of the Week Card
21a—Day of the Week Text
22—Day of the Week Card Rear Surface
23—Day of the Week Card Side Edge
24—Right Hanging Hole Exit Point
25—Left Hanging Hole Exit Point
26—Personalization Area
27—Picture Card Slider Partition Front Aperture
28—Day of the Week Slider Partition Front Aperture

DETAILED DESCRIPTION

Figure 1:
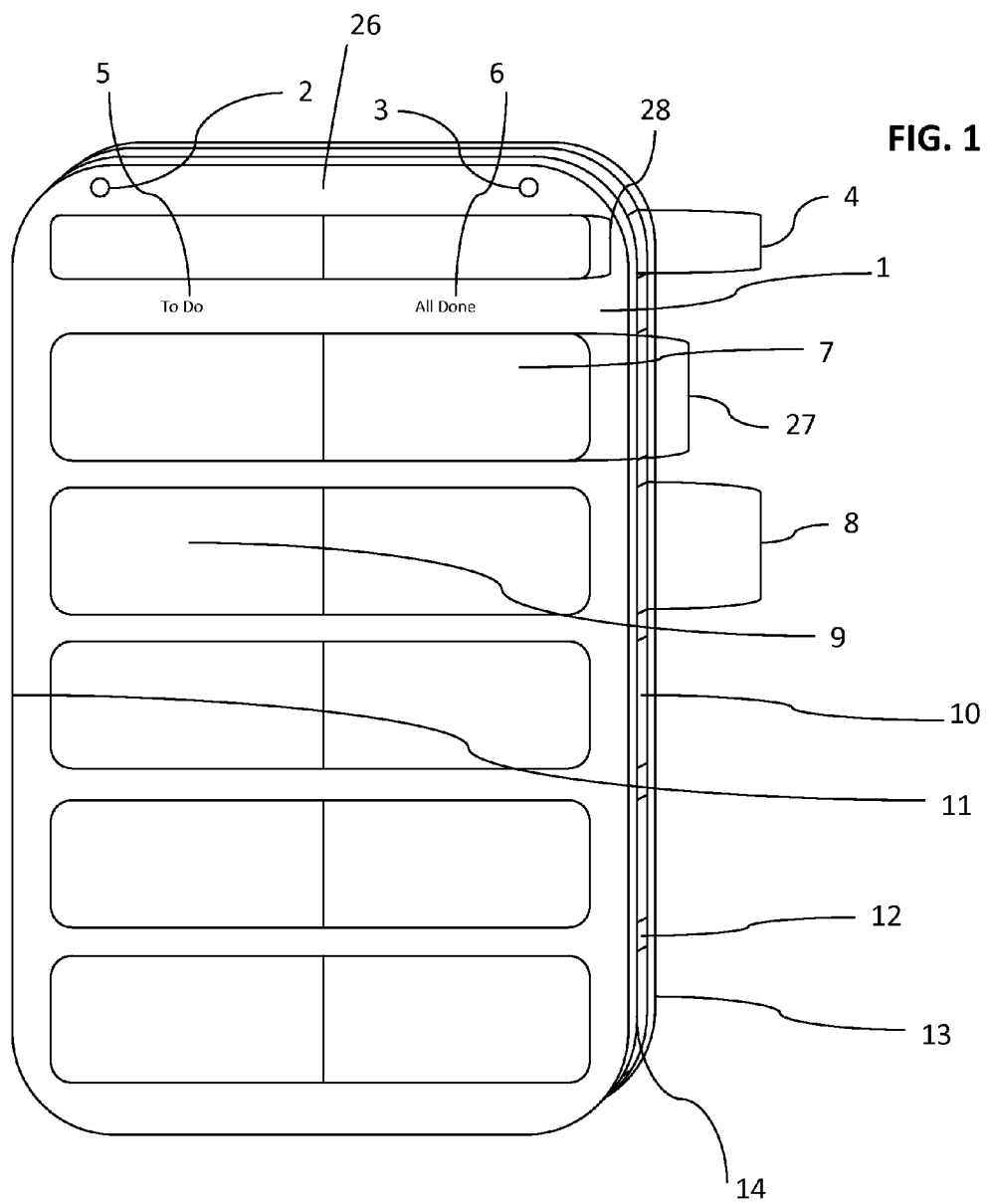
FIG. 1 is a perspective view of one embodiment of the invention, depicting the front of the board, hanging holes, column descriptions, inner partitions, and distinct columns within the inner partitions.

Considering the drawings of this embodiment, particularly by reference character, reference 1 of FIG. 1 depicts the frontal area of the board (depicted as a whole in FIG. 1) where all activity is viewed and takes place. The board contains a plurality of slider partitions 4 and 8 that exist within the structure of the board, and are open to the front to create a viewing area that is unobstructed. Partition 4 accommodates the day of the week card FIG. 4/A/B/C, partition 7 (including all those of the same size repeated along the length of the board) accommodates picture cards FIG. 4A/B/C. Each slider partition has an entry point 11, and an exit point 10, allowing the picture cards FIG. 4A/B/C and day of the week card FIG. 4A/B/C to be entered on the left of the board, slid across to the right of the board, and taken out (this can be achieved either via the entry 11 or exit point 10). Picture cards FIG. 4A/B/C are slid across the front of the board (after insertion at the entry point 11) by using a finger pressed on the front surface 18 of the picture card FIG. 4A/B/C to provide motion between the two interior columns.

Figure 4A:
FIG. 4A is a plan view of a picture card displaying a simple activity and accompanying descriptive word(s).
Figure 4B:
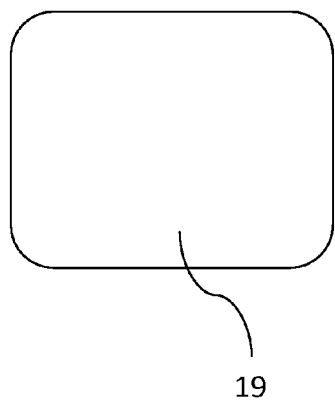
FIG. 4B is a plan view of the rear of a picture card.
Figure 5A:
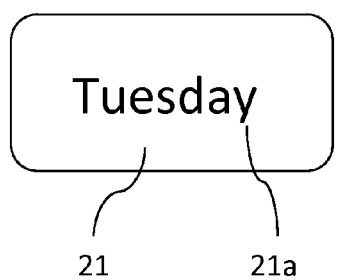
FIG. 5A is a plan view of a day of the week card displaying day of the week text.
Figure 5B:
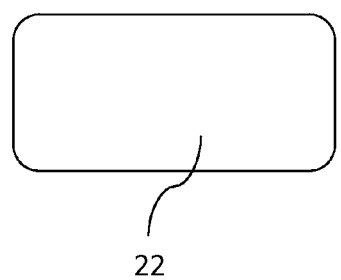
FIG. 5B is a plan view of the rear of a day of the week card.

The board (in this embodiment composed of layers 14, 13, and interior layer slider partition dividers exemplified by 12, affixed to create one unified piece) is comprised of a suitable material such as plastic, wood, or reinforced paper products, and manufactured in such a way as to provide inner partitions of a suitable size that allow the unimpeded passage of picture cards FIG. 4A/B/C and day of the week cards FIG. 5A/B/C from one edge of the board to the other. The board is rectangular in shape and a uniform thickness throughout.

As shown in FIG. 1, the picture card slider partition front apertures 27 are rectangular openings of uniform size (narrower than the width of the board to provide a 'frame-like' opening) that expose the distinct columns 7 and 9 in the inner rear portion of the board 13. Column 7 is distinguished by a contrasting color to column 9 and the overall color of the board itself. Column 9 is distinguished by a contrasting color to column 8 and the overall color of the board itself. Column 9 is headed with the 'To Do' 5 designation printed on the exterior front surface of the board 1. Column 7 is headed with the 'All Done' 6 designation printed on the exterior front surface of the board 1. The purpose of descriptive writing and color coding of the columns is to distinguish the areas where picture cards FIG. 4A/B/C are placed that signify whether a task or sub-task is completed, or still to be completed.

The inner area of the day of the week slider partition 4 and picture card slider partitions 8 is of larger dimension than the size of the day of the week and picture card slider partition apertures 27 and 28. The larger inner dimension accommodates the size and passage of picture cards FIG. 4A/B/C and day of the week cards FIGS. 5A/B/C, however the smaller frontal opening prevents the cards FIG. 4A/B/C and FIG. 5A/B/C from falling out of the board while in use.

The board has two holes, 2 and 3, that are circular in shape, and placed in the top left 2 and top right 3 corners to allow users to apply a material suitable (for example: rope, ribbon, twine) for hanging the board in any appropriate location in their home. These holes pass completely through each layer of the board. The exit point of these holes is demonstrated in FIG. 2, reference characters 24 and 25.

Reference 26 of FIG. 1 depicts an open area at the top of the board where individuals may affix self-adhesive lettering in order to add the users name to the board. This is an aspect of personalization available to use at the owners discretion.

Figure 2:
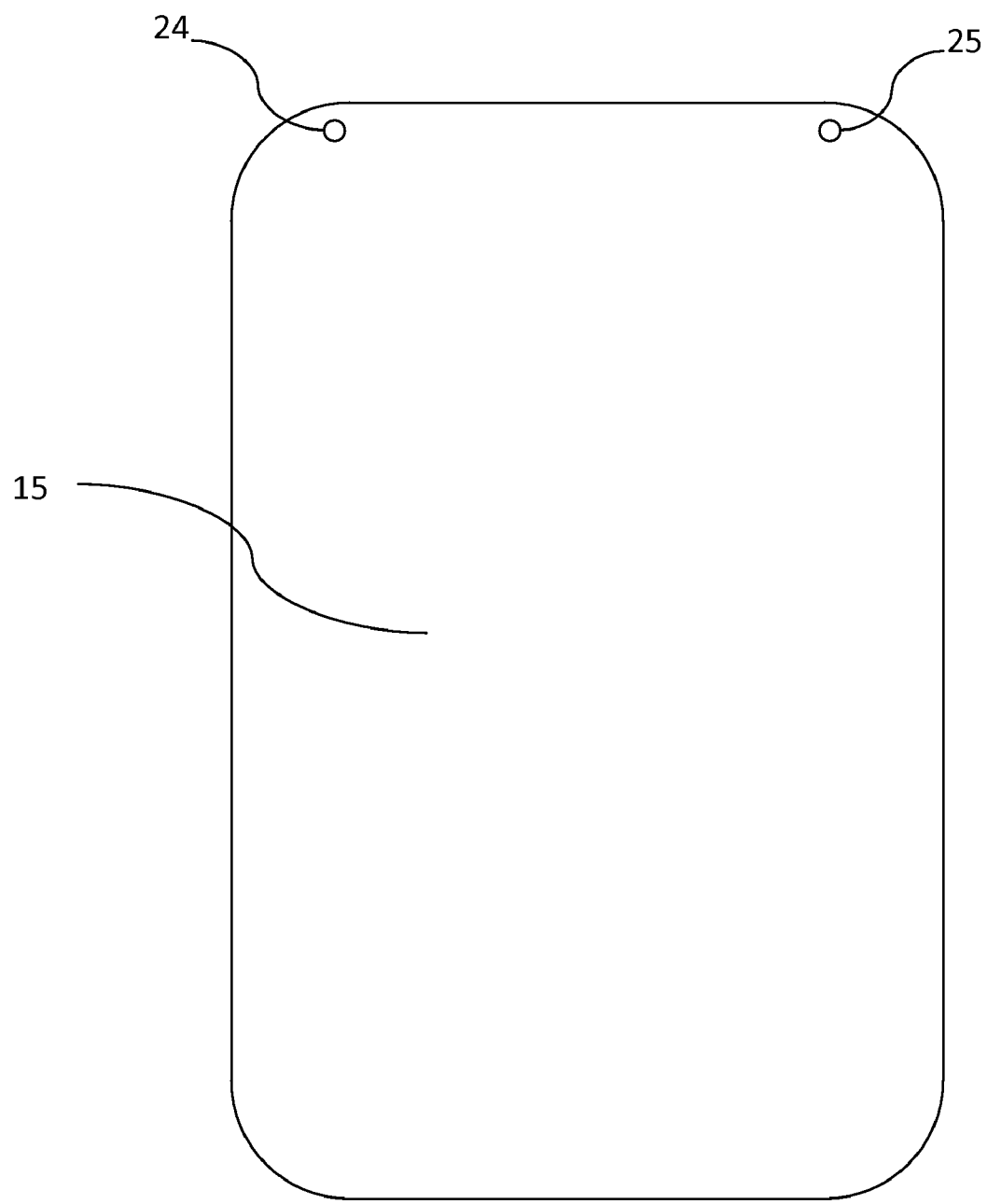
FIG. 2 is a plan view of the invention, depicting the rear of the board and hanging holes.

FIG. 2 depicts a plan view of the rear of the board 15. The rear of the board is a flat surface of the same color and texture as the front of the board 1.

Figure 3:
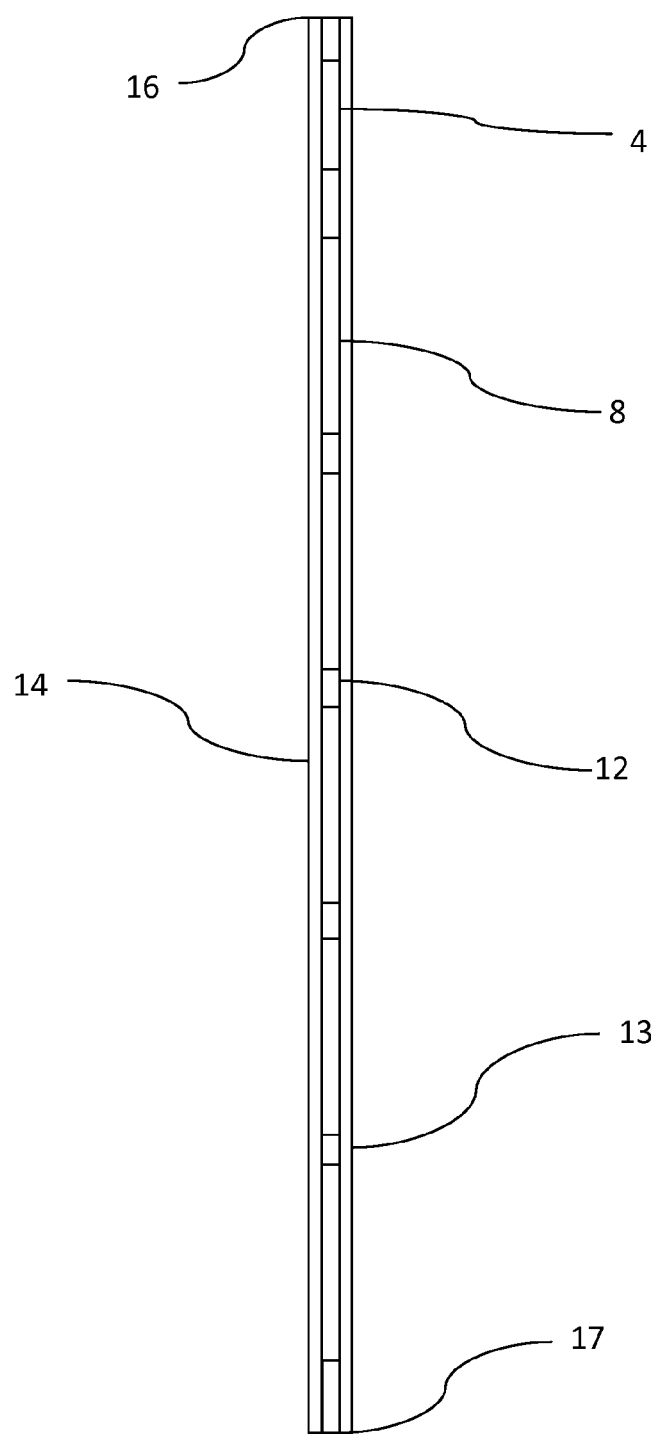
FIG. 3 is a side view of the invention, depicting the exit-openings, spaced along the edge of the board.

FIG. 3 depicts a plan view of the side of the board. Both the left and right sides of the board are identical, providing entry and exit points for picture cards FIG. 4A/B/C and day of the week cards FIG. 5A/B/C. Slider partitions accommodating picture cards 8 are spaced uniformly along the length of the board (subsequent to the day of the week slider partition 4) and are of equal dimension. The day of the week partition 4 is of a different, smaller dimension than the picture card slider partitions, and is the uppermost slider partition, located near the top of the board 16. The last picture card slider partition is located near the bottom of the board 17.

Figure 4C:
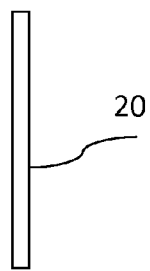
FIG. 4C is a side view of a picture card.

FIG. 4A/B/C provide varying views of the picture cards that are used in conjunction with the board. The front of the picture card 18 is printed with a simple drawing 18a depicting an activity or a sub-task within an activity. Examples of an activity for children between 5 and 10 may be 'eat breakfast', 'tidy bedroom', or 'go swimming', and examples of a sub-activity regarding the sequence of potty training may be 'pants down', 'wipe', or 'wash hands'. Each picture card includes the drawing 18a and descriptive word(s) 18b that accompany the drawing to appeal to all users regardless of language skills. A plurality of drawings will be made available to users in 'packs' according to their needs. The picture cards will be comprised of a suitable material such as plastic, wood, or reinforced paper products that will be printed on one side 18, and blank on the rear 19. FIG. 4C depicts a side view of a picture card 20 to demonstrate width. These picture cards 18 are rectangular in shape and of a uniform thickness marginally smaller than the interior dimensions of the picture card slider partitions 8 to facilitate smooth movement across the board. There will be a number of completely blank picture cards included in the packs to provide the user with the flexibility to include activities or sub-activities that have not been anticipated and therefore not included in the packs. Drawings or photographs may be affixed to the blank cards to simulate the desired activity or sub-activity.

Figure 5C:
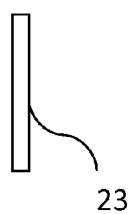
FIG. 5C is a side view of a day of the week card.

FIG. 5A/B/C provide varying views of the day of the week cards that are used in conjunction with the board. The front of the day of the week card 21 is printed with day of the week text 21a, and blank on the rear 22. One card for each day of the week is included. The day of the week cards will be comprised of a suitable material such as plastic, wood, or reinforced paper products, are rectangular in shape, and of a uniform thickness marginally smaller than the interior dimensions of the day of the week card slider partitions 4 to facilitate smooth movement across the board. FIG. 5C depicts the side view of the day of the week card 23 to demonstrate width.

Operation

In its simplest form, it is anticipated that picture cards FIG. 4A/B/C will be selected and ordered according to a desired sequence of activities, or to depict the steps involved in a specific routine.

The choice of picture cards FIG. 4A/B/C used is dependent upon the tasks agreed by parent (or teacher or caregiver) and child (or patient), or specific to the subtasks being learned as part of a new sequence. Each picture card FIG. 4A/B/C that is included depicts a unique activity picture 18a using a representation that is easy for varying age groups to understand. The picture of the activity is accompanied by the descriptive word(s) 18b for the benefit of older users, or to encourage language development in younger users and those yet unable to read. The rear of the picture cards 19 is blank as the viewing area open to those using the board FIG. 1 is at the front and nothing of the interior can be seen from the rear FIG. 2. The picture cards are of a thickness 20 that is marginally smaller than the interior of the picture card slider partitions 8 to allow the unimpeded progress of the card through the entire interior of the board FIG. 1.

To begin loading the board FIG. 1, the day of the week card FIG. 5A/B/C is selected according to the current day and slid into the day of the week slider partition 4 from the entry point on the left side of the board. Use of the day of the week card is not mandatory. One picture card FIG. 4A/B/C is placed in each of the slider partition entry points 11, initially positioned in the 'To Do' column 9. The number of cards placed in the slider partitions is at the discretion of the user—there is no requirement for all partitions to be filled. The board FIG. 1 is then placed in a location that is visually and physically accessible to the user.

In the instance where a sequence of sub-tasks is being displayed to younger children, and a parent, teacher, or caregiver is using the invention to teach the steps of a new sequence (such as potty training) they may present the board (including already positioned picture cards FIG. 4A/B/C in the 'To Do' column 9), to the child or patient at the time where use is most appropriate. Using potty training as a non-exclusive example, the parent would position the board FIG. 1 in the bathroom, and have it available to the child to display the steps being currently taught, and encourage them to view and follow the steps depicted. This serves as affirmation of the verbal instructions being given, and reinforces the process in a way that is stimulating and easy to understand. As each step within the activity is completed, the picture cards FIG. 4 A/B/C are slid across from the 'To Do' column 9, to the 'All Done' column 7 to signify which steps have been completed, and what remains outstanding. Movement of the picture cards FIG. 4A/B/C (and day of the week card FIG. 5A/B/C) is achieved by pressing a finger on the face of the card (which is accessible through the front 'frame-like' opening of each slider partition 27) and sliding it along the interior channel. This movement is guided by the interior slider partition dividers 12.

The movement of all picture cards from one column to the next is the result of a completed sequence.

In the instance where a sequence of sub-tasks are being displayed to older children, the invention may be used independently by the child, and placed in a location suitable for viewing and use during the completion of the sub-tasks. For example, the child may use the board FIG. 1 and inserted picture cards FIG. 4A/B/C as a reminder of the steps involved in cleaning their room, preparing to go to bed, or even for the making of a peanut butter and jelly sandwich. The visual representation helps them become familiar with each step in the process, and movement of the picture cards FIG. 4A/B/C from the 'To Do' 9 column to the 'All Done' column 7 as they proceed helps to keep track of what is to be done, and what remains outstanding.

In the instance where the invention is being used to elicit help and participation in household routines, and relieve the frustrations felt by parents, the board may be placed in a prominent location that both the parent and child can view. For this purpose, the board FIG. 1 depicts activities that the parent and child have agreed upon, and that the child will engage in independently. Movement of the picture cards FIG. 4A/B/C from the 'To Do' column 9, to the 'All Done' column 7 represents a completed task, and reminds the child of what remains. The parent is afforded the opportunity of not having to persistently remind their child (nag), and can check on progress without appearing overbearing, or experiencing increased frustration.

After all picture cards have been moved to the 'All Done' section of the board 9, additional reinforcement may or may not be performed at the users' discretion. In the case of a parent or teacher, an agreed token reward may be given to a child, or simple encouragement at task completion. It is not a fundamental element of this invention to require rewards in exchange for tasks completed, however it is possible to apply an incentive if this is something the child or other user responds well to.

Regardless of the activity or sequence being depicted, the board may be reloaded or reorganized at any time by removing the currently used picture cards FIG. 4A/B/C and replacing them with different ones. Picture cards FIG. 4A/B/C (and the day of the week card FIG. 5A/B/C) can be removed by sliding them to the slider partition exit points 10 and out of the right side of the board. The same effect is achieved via the entry points 11, however it is anticipated that cards are more likely to be removed after being slid to the 'All Done' position 7.

ADVANTAGES

From the description above, a number of advantages of some embodiments become evident:
(a) It provides children with a sequence of activities that are kept to a short time-frame and are therefore easier for young minds to conceptualize and understand.
(b) It displays simplistic symbols accompanied by the defining word(s) which make it usable regardless of language skills.
(c) It does not function simply as a token reward system. Parents or teachers may include rewards as a motivator if required, however it is not a distinct attribute of the invention, and does not establish a reward as the only motivating factor to facilitate compliance with activities or sub-activities.
(d) It may also be used in multiple locations. It can be attached to a metallic or solid surface by applying magnets or suction cups. It may be hung on a door-handle or hook by utilizing the hanging holes. It may be propped on a bookshelf, or against the wall. This provides the advantage of being usable in any location where a day planner, visual schedule, or sub-task planner is best displayed.
(e) A plurality of activities and sequences that may be depicted by picture cards that are useful for many age groups and situations. The non-static nature of the representations displayed on the board make it vastly versatile and usable throughout many stages of child development.
(f) The sliding aspect invites interaction with the user by employing a simplistic mechanism that is so simple to manipulate that all ages of user can operate it independently if required.
(g) Tracking and completion of an activity is easily visually monitored and confirmed by simply sliding the picture cards across to a distinct position that signifies the users progress.

CONCLUSION, RAMIFICATIONS, AND SCOPE

Accordingly, the reader will see that, the visual schedule of the embodiment described provides a system to help various ages of children (although it is not exclusive to this group) learn new routines, perform sequences, or learn the sub-tasks involved in an overall activity.

Providing a visual break down of the steps involved in a sequence not only takes advantage of children's visual memory, but it segments a task in such a way as to clarify verbal communications and connect a spoken requirement to a pictorial representation of that requirement, fixing its meaning in the child's memory. This aspect is beneficial for parents who feel frustrated by what appears to be a lack of understanding on behalf of their child, and gives them a tool to convey their requests with an additional dimension that is more appropriate for their child.

Children receive an intangible reward for jobs done or sequences learned using this planner, rather than a 'bargained for' gesture. They gain independence through learning a new sequence or understanding their responsibilities, and having a means of tracking their progress.

Furthermore, the sliding mechanism used to move the visual cues in, out, and across the board invites interaction, and makes it easy for many age groups to persistently utilize the system. There is no need for the user to be able to read or write, only that they can recognize visual cues and are able to use a finger to slide a picture card across the board. The versatility afforded by this system to depict any activity that can be broken down into a series of steps makes it useful in a vast number of situations, and not simply as a means of assigning chores.

While the above description contains many specificities, these should not be construed as limitations on the scope of any embodiment, but as exemplifications of the presently preferred embodiment thereof. Many other ramifications and variations are possible within this and other embodiments. For example, the board could be of different shapes, such as square or oval, the number of picture slider card partitions could be increased or decreased, making the board longer or shorter, the shape of the picture and day of the week cards could be changed, the board could be made in segments that snap together to make it of varying lengths, the outer surfaces of the board could be coated in a material that allowed it to be written upon Thus the scope of the invention should be determined by the appended claims and their legal equivalents, and not by the example given.

We claim:

1. A motivational visual device, comprising:
  a. a board, said board comprising:
    i. a front panel, said front panel comprising:
      1. a plurality of openings that allow the interior of said board to be exposed,
      2. a column designation indicating a starting position,
      3. a column designation indicating an ending position,
    ii. interior dividers creating channels that are aligned with said openings on said front panel including:
      1. said channels extend through the full width of said board,
      2. said channels are open to both the left and right sides of said board,
    iii. a rear panel, said rear panel containing:
      1. two distinct columns created on a vertical axis each apportioned one half of the surface area of said rear panel,
      2. said distinct columns face the interior of said board and are viewable through said openings of said front panel,
  b. a plurality of cards, said cards comprising:
    i. pictures and descriptive words depicting activities common to children's daily activities, ii. pictures and descriptive words depicting activities common to children's daily routines,
iii. pictures and descriptive words depicting sub-tasks within an activity or routine,
iv. day of the week lettering,
v. a predetermined size that allow unimpeded passage through the interior of said channels of said board.

2. A method of teaching sequences, comprising the steps:
a. providing the apparatus of claim 1,
b. selecting a predetermined number of pictorial representations that signify a sequence or steps within a sequence,
c. arranging said pictorial representations into an order that reflects their desired sequence,
d. displaying said pictorial representations in said order in a linear position clearly represented as a starting position,
e. placing a finger on the face of the first pictorial representation as noted by the predetermined order and applying sufficient pressure to move said pictorial representation along a horizontal axis to a clearly represented ending position,
f. repeating the movement of remaining said pictorial representations in subsequent order along said horizontal axis using a finger and applying pressure until all said pictorial representations are positioned in said clearly represented ending position.

* * * * *